(12) United States Patent
Voit et al.

(10) Patent No.: US 9,787,572 B2
(45) Date of Patent: Oct. 10, 2017

(54) CONFLICT AVOIDANT TRAFFIC ROUTING IN A NETWORK ENVIRONMENT

(71) Applicant: CISCO TECHNOLOGY, INC., San Jose, CA (US)

(72) Inventors: Eric A. Voit, Bethesda, MD (US); Samer Salam, Vancouver (CA); Ludwig Alexander Clemm, Los Gatos, CA (US); Yegnanarayanan Gargya Chandramouli, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 14/508,680

(22) Filed: Oct. 7, 2014

(65) Prior Publication Data

US 2016/0099883 A1 Apr. 7, 2016

(51) Int. Cl.
*G06F 15/173* (2006.01)
*H04L 12/707* (2013.01)
(Continued)

(52) U.S. Cl.
CPC .......... *H04L 45/22* (2013.01); *H04L 41/0873* (2013.01); *H04L 45/28* (2013.01); *H04L 41/0672* (2013.01); *H04L 47/122* (2013.01)

(58) Field of Classification Search
CPC ... H04L 47/74; H04L 47/122; H04L 41/0893; H04L 41/0873; H04L 41/0672;
(Continued)

(56) References Cited

U.S. PATENT DOCUMENTS

| | | | |
|---|---|---|---|
| 7,519,964 B1* | 4/2009 | Islam | G06F 8/44 717/177 |
| 2005/0278274 A1* | 12/2005 | Kovachka-Dimitrova | G06F 8/65 |

(Continued)

OTHER PUBLICATIONS

"Distributed SDN Controllers for Rich and Elastic Network Services; Infrastructures materielles et logicielles pour la societe numerique (INFRA) 2013: project DISCO," The French National Research Agency, Projects for Science, Jan. 2013, 3 pages; http://www.agence-nationale-recherche.fr/en/anr-funded-project/?tx_lwmsuivibilan_pi2%5BCODE%5D=ANR-13-INFR-0013.

(Continued)

*Primary Examiner* — Ario Etienne
*Assistant Examiner* — Kidest Mendaye

(57) ABSTRACT

An example method for facilitating conflict avoidant traffic routing in a network environment is provided and includes detecting, at a network element, an intent conflict at a peer network element in a network, and changing a forwarding decision at the network element to steer traffic around the conflicted peer network element. The intent conflict refers to an incompatibility between an asserted intent associated with the traffic and an implemented intent associated with the traffic. In specific embodiments, the detecting includes mounting rules from the peer network element into the network element, and analyzing the mounted rules to determine intent conflict. In some embodiments, a central controller in the network deploys one or more intentlets on a plurality of network elements in the network according to corresponding intent deployment parameters.

20 Claims, 9 Drawing Sheets

(51) Int. Cl.
*H04L 12/24* (2006.01)
*H04L 12/703* (2013.01)
*H04L 12/803* (2013.01)

(58) Field of Classification Search
CPC . H04L 63/101; H04L 12/244; H04L 63/0227; H04L 45/22; H04L 45/28
See application file for complete search history.

(56) References Cited

U.S. PATENT DOCUMENTS

| | | | | |
|---|---|---|---|---|
| 2010/0130170 | A1* | 5/2010 | Liu | H04W 36/0022 455/411 |
| 2011/0238855 | A1* | 9/2011 | Korsunsky | G06F 21/55 709/231 |
| 2012/0131197 | A1* | 5/2012 | Prentice | H04L 61/103 709/226 |
| 2014/0075498 | A1* | 3/2014 | Porras | H04L 63/107 726/1 |
| 2014/0115655 | A1* | 4/2014 | Marvais | H04L 41/0893 726/1 |
| 2015/0089566 | A1* | 3/2015 | Chesla | H04L 63/20 726/1 |
| 2016/0094463 | A1* | 3/2016 | Nguyen | H04L 45/306 370/235 |

OTHER PUBLICATIONS

Finkelstein, Shel, et al., "Transactional Intent," 5th Biennial Conference on Innovative Data Systems Research (CIDR '11), Jan. 9-12, 2011, Asilomar, California, USA, 10 pages; http://www.cidrdb.org/cidr2011/Papers/CIDR11_Paper12.pdf.

"HermitT OWL Reasoner: The New Kid on the OWL Block," Information Systems Group, Department of Computer Science, University of Oxford, published on or about Jul. 5, 2013, 2 pages; http://hermit-reasoner.com/.

Horrocks, Ian, et al., "SWRL: A Semantic Web Rule Language Combining OWL and RuleML; W3C Member Submission May 21, 2004," Copyright © 2004 National research Council of Canada, Network Inference, and Stanford University. All Rights Reserved; May 21, 2004, 49 pages; http://www.w3.org/Submission/SWRL/Overview.html.

Kodeswaran, Sethuram Balaji, et al., "Utilizing Semantic Policies for Secure BGP Route Dissemination," Tech Report, Sep. 2007, 5 pages; http://ebiquity.umbc.edu/_file_directory_/papers/380.pdf.

Monaco, Matthew, et al., "Applying Operating System Principles to SDN Controller Design," ACM Hotnets '13, Nov. 21-22, 2013, College Park, MD, USA, Copyright 2013 ACM 978-1-4503-2596-7, 7 pages; http://conferences.sigcomm.org/hotnets/2013/papers/hotnets-final97.pdf.

"Pellet: OWL 2 Reasoner for Java," Clark & Parsia, published on or about Apr. 23, 2013, 3 pages; http://clarkparsia.com/pellet/.

Pritchett, Dan, "Base: An Acid Alternative," ACM Queue, Jul. 28, 2008, 7 pages http://queue.acm.org/detail.cfm?id=1394128.

Smith, Michael K., et al., Editors, "OWL Web Ontology Language Guide: W3C Recommendation Feb. 10, 2004," Copyright © 2004 W3C (MIT, ERCIM, Keio), All Rights Reserved; Feb. 10, 2004; 72 pages; http://wwww.3.org/TR/owl-guide/.

* cited by examiner

CONFLICT AVOIDANT TRAFFIC ROUTING IN A NETWORK ENVIRONMENT

TECHNICAL FIELD

This disclosure relates in general to the field of communications and, more particularly, to conflict avoidant traffic routing in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating conflict avoidant traffic routing in a network environment is provided and includes detecting, at a network element, an intent conflict at a peer (e.g., belonging to a same network level, for example, in terms of functionality; equal; substantially similar in functionality; etc.) network element in a network, and changing a forwarding decision at the network element to steer traffic around the conflicted peer network element. The intent conflict refers to an incompatibility between an asserted intent associated with the traffic and an implemented intent associated with the traffic. In specific embodiments, the detecting includes mounting (e.g., loading into local memory; making accessible; attaching; etc.) rules from the peer network element into the network element, and analyzing the mounted rules to determine intent conflict. In some embodiments, a central controller in the network deploys one or more intentlets on a plurality of network elements in the network according to corresponding intent deployment parameters.

As used herein, the term "intent" comprises an expression of goals and constraints that may be met by a business transaction, including configurations that can be applied across multiple network elements in a network. Intent may be regarded as metadata; it does not describe what has happened (data) or what is going to happen (plan or projections); instead, it describes what the intent submitter would like to happen. Intent may be asserted on a particular network element, and the network element may convert the asserted intent to an implemented intent, comprising a specific configuration (e.g., rule in an access control list, port parameters, etc.) As used herein, the term "intentlet" refers to a portion of intent distributed across network elements. Examples of an intentlet include a policy snippet, a configuration snippet, such as for guiding some aspect of network element behavior. Intentlets can comprise a set of Network Configuration Protocol (NETCONF) operations applied to a data store sub-tree comprising a set of policies.

Example Embodiments

Figure 1:
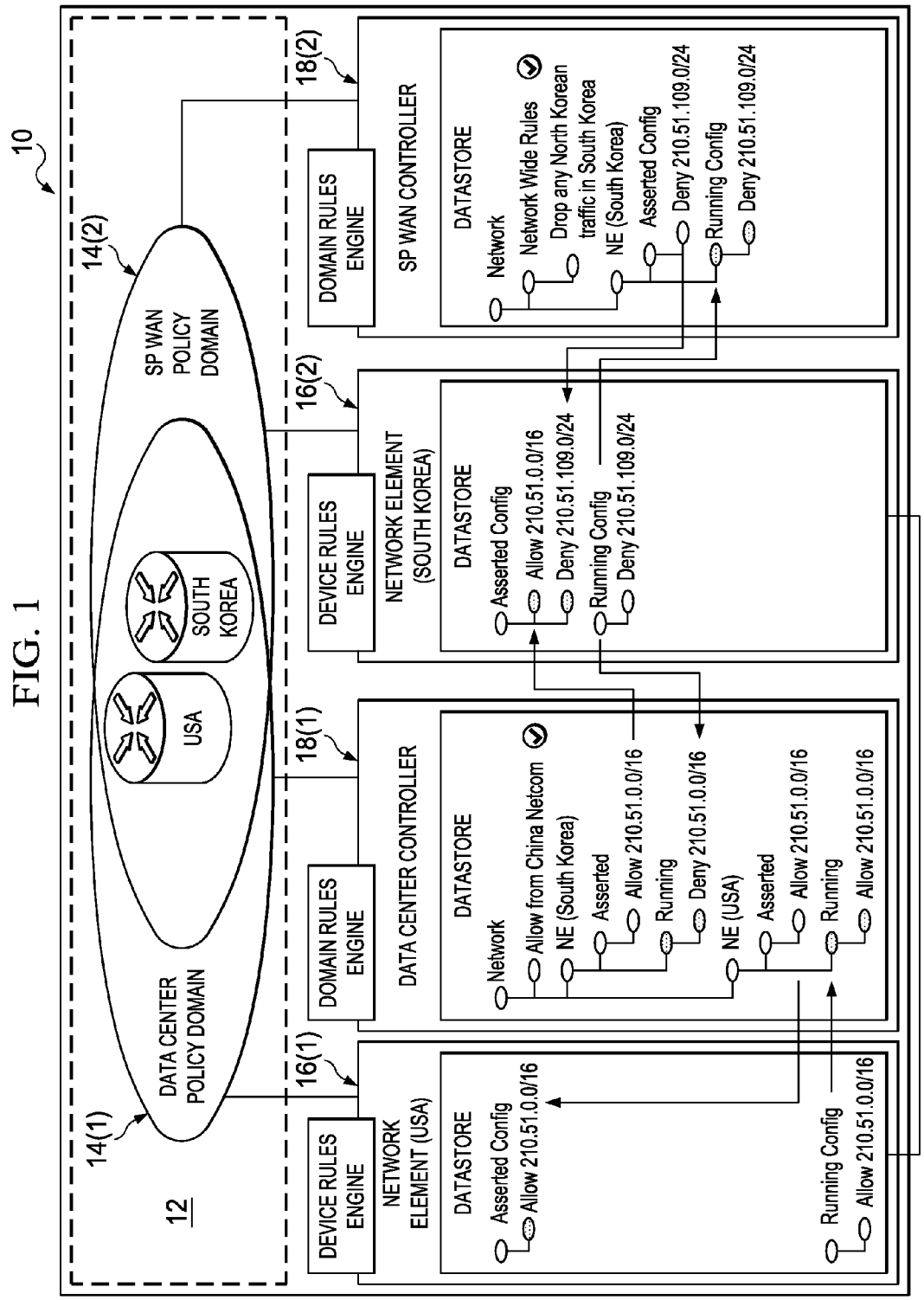
FIG. 1 is a simplified block diagram illustrating a communication system for facilitating conflict avoidant traffic routing in a network environment.

Turning to FIG. 1, FIG. 1 is a simplified block diagram illustrating a communication system 10 for facilitating conflict avoidant traffic routing in a network environment in accordance with one example embodiment. FIG. 1 illustrates a network 12 comprising two policy domains, a data center policy domain 14(1) and a service provider (SP) wide area network (WAN) policy domain 14(2). Each policy domain 14(1) and 14(2) may comprise a plurality of network elements (e.g., network element 16(1) in data center policy domain 14(1) and network element 16(2) in SP WAN policy domain 14(2)) and at least one controller (e.g., data center controller 18(1) in data center policy domain 14(1) and SP WAN controller 18(2) in SP WAN policy domain 14(2)).

In a general sense, a policy domain includes a network segment in which certain policies may be asserted over substantially all network elements in the network segment. Separate policy domains may have separate policies asserted in the respective network elements. Each policy domain can span any suitable geographic area, from a few network elements within a small local area, to large global deployments spanning international boundaries. As used herein, the term "network element" is meant to encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

According to various embodiments, network traffic may be forced through paths in network 12 where network intent (e.g., configuration snippets, policies, etc.) has been established and appropriate policies have been applied successfully. Various embodiments of communication system 10 may also provide for a management service that allows for roughly consistent application of intent across network 12 with a set of associated management processes, to be used by applications that do not have stringent transactional requirements.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Policy-based management allows configuring and reconfiguring differentiated services networks to achieve desired Quality of Service (QoS) goals. Relevant configuration involves implementing network provisioning decisions, performing admission control, and adapting bandwidth allocation dynamically according to emerging traffic demands. The policy-based approach can facilitate flexibility and adaptability, for example, to change the policies without changing the implementation in a particular network element. However, as with any other complex system, conflicts and inconsistencies may arise in the policy specification.

For example, networks are increasingly being managed as a system through a single point of administration and control, as opposed to users dealing with the network one device at a time. However, networks continue to consist of multiple interconnected devices each with their own configuration, which can lead to policy conflicts in implementation. Such may be the case even with large-scale deployment of controller-based software defined networking (SDN) architectures, because some functionality may be provided locally (e.g. at the edge of a network), without referring back to a centralized controller each time. One general problem in applying intent across such networks concerns consistent application of intent.

A commonly stated network requirement is that the configuration encompassed by the intent take effect across all network elements where it is to be applied, or not at all. For example, policy that is to be consistently applied across a network may have to be configured on network elements themselves (which have their own local policy decision points) as opposed to involving a central policy decision point at the controller. However, there are several problems associated with such capabilities: a single failure to commit a configuration or apply an action at a single network element can negate the entire transaction and prevent it from taking effect at any of the network elements. Delays encountered at one system (for example, due to need for multiple retries for internal reasons, intermittent communication failures, etc.) affect the entire network. In effect, the 'herd' of networking network elements only moves as slow as its slowest member.

However, one reason for complexity associated with traditional management applications concerns the complexity of dealing with situations in which inconsistencies are encountered, in addition to the general attempt to emulate a "network transaction" to the greatest extent possible. A mitigation is to move the policy decision point to the controller, but the mitigation can introduce dependencies on the controller that are not always acceptable. In some scenarios, "rough consistency" may be sufficient, where guarantees are not really required as long as the resulting "inconsistency" is easy to manage, giving users an indication of just how consistently (or inconsistently) configurations have been applied, providing them opportunities to react or specify policies in case of significant deviations across the network, and offering the possibility that intent can eventually converge over time.

For example, in service level monitoring, which commonly involves configuration, for example "conduct periodic measurements of jitter and RTT to a given service," complete coverage can rarely be achieved, and is commonly not needed if samples are "large enough" to provide an overall "temperature" regarding service levels being adequate. In another example, distributed connection admission control schemes can limit overall load on certain networking services. Even if some systems do not throttle back at the network edge, additional throttling can occur in the server. In many such cases, load thresholds may be approximate to begin with. Yet another example includes brownfield deployments, in which heterogeneous network elements may not have the capability to support the configuration. Often it may be sufficient to identify the network elements at which the configurations were successfully implemented and the network element at which the configurations were not successfully implemented.

Communication system 10 is configured to address these issues (among others) to offer a system and method for facilitating conflict avoidant traffic routing in a network environment. According to various embodiments, network element 16(1) may detect an intent conflict at peer network element 16(2) in network 12, peer network element 16(2) being coupled (e.g., connected, attached, interconnected, etc., either directly or remotely) to network element 16(1) over a network interface of network element 16(1). Network element 16(1) may change a forwarding decision (e.g., rewrite a local routing table, rewrite packet headers, etc.) to steer traffic around conflicted peer network element 16(2). The detecting can include mounting rules from peer network element 16(2) into network element 16(1) over the network interface, and analyzing the mounted rules for inconsistency to determine the intent conflict. The mounted rules may be acquired from a locally addressable data store and analyzed appropriately using any suitable method known in the art.

In many embodiments, network element 16(1) may identify another peer network element that does not have the intent conflict, and change the forwarding decision to steer traffic to the other peer network element. In a general sense, the intent conflict refers to an incompatibility between an asserted intent associated with the traffic and an implemented intent associated with the traffic. In some embodiments, the asserted intent is pushed by a controller (e.g., data center controller 18(1)) and is inconsistent with the implemented intent being executed on conflicted network element 16(2) based on a prior asserted intent pushed by another controller (e.g., SP WAN controller 18(2)). Until the intent conflict is resolved, conflicted network element 16(2) cannot forward packets, and the intent conflict can inject latencies into the traffic flow. In some embodiments, network element 16(1) may automatically generate a list of network elements that are conflicted, and ensure that traffic is steered away from any network element on the list.

Assume, merely for example purposes that SP WAN controller 18(2) includes a network wide intent to drop traffic from North Korea at any network element located in South Korea. Assume also that network element 16(2) is located in South Korea. The intent may be asserted at network element 16(2) by specifying the intent as such, and implemented at network element 16(2) by monitoring traffic and denying any traffic to and from IP addresses 210.51.190.0/24 located in North Korea.

Assume, merely for example purposes that data center controller 18(1) allows traffic from China Netcom, which can include North Korean traffic. When data controller 18(1) applies its intent to allow China Netcom traffic on network element 16(2), a conflict arises between the asserted intent (e.g., to allow traffic to and from 210.51.0.0/16 representing a portion of the China Netcom traffic), and the implemented intent (currently executing on network element 16(2)) that denies traffic to and from 210.51.190.0/24. According to various embodiments, China Netcom traffic may be routed around network element 16(2) until the rule conflict is resolved, for example, by respective rules engines. In an example, China Netcom traffic may be routed through network element 16(1), located in USA and which allows traffic to and from 210.51.0.0/16.

In various embodiments, network element 16(1) may monitor two sides of an interface connecting network element 16(1) with peer network element 16(2). Network element 16(1) may mount rules stored in network element 16(2), including asserted intent and implemented intent. Network element 16(1) may detect an intent conflict at network element 16(2). Consequently, network element 16(1) may change its forwarding decision and route traffic away from network element 16(2) and towards another network element that does not have any intent conflicts therein.

According to various embodiments, traffic may be routed to avoid network elements having local intent conflicts. Also, embodiments of communication system 10 can facilitate rerouting traffic to network elements that are known to support certain intents and where no conflicts exist. For example, embodiments of communication system 10 can apply to contexts wherein domains promise not to route traffic outside a geographical boundary, domain/devices promise to deliver IP-Fix/Flow records of quality of service (QoS) experience, path promises to hit latency guarantees, etc. Avoiding sending traffic through places in the network where policy conflicts might be in play may be similar to routing airplanes around stormy locations. The procedure may be safer in some situations.

According to embodiments of communication system 10, network elements (e.g., 16(1), 16(2)) can automatically generate a list of network elements where potential intent conflicts exist (e.g., where one or more criteria of two policy domains such as 14(1) and 14(2) are conflicted). In other words, traffic that may be subject to unresolved policies in network 12 may avoid network elements (e.g., 16(2)) where conflicts exist. Such conflict avoidant traffic routing can be easier and faster than resolving conflicts, and/or waiting for conflicts to be resolved. Thus, when a conflict is discovered, traffic may be rerouted accordingly, analogous to a Fast Reroute (FRR) capability, which facilitate steering traffic around areas of link breakage.

In some embodiments, network elements (e.g., 16(1)) may selectively route matching traffic to a FRR path to avoid the conflicted network element (e.g., 16(2)), and/or the network element that is in the process of resolving conflicting policies. In various embodiments, the network elements (e.g., 16(1)) may direct traffic to where appropriate policies have been successfully applied, forcing traffic through paths where network intent has been successfully established. In some scenarios, intent cannot be serviced (e.g., a transaction fails, or only a partial intent is supported) appropriately. In various embodiments, network elements that have allowed full intent to be implemented without conflicts may be used on paths for appropriate traffic that require the full intent to be implemented.

Note that such intent conflict detection activities are performed locally, at network element 16(1), and are not pushed, controlled, or orchestrated by any centralized controller (e.g., 18(1), 18(2)), although the intents are asserted by the centralized controller. For example, a central controller (e.g., 18(1)) may deploy one or more intentlets on a plurality of network elements (e.g., 16(1), 16(2)) in network 12 according to corresponding intent deployment parameters. The intentlets may be deployed according to pre-configured accuracy and convergence bounds, for example, set by a user. The controller (e.g., 18(1)) may maintain status information connected with the intentlet deployment on each of the plurality of network elements. The central controller (e.g., 18(1)) may monitor the intentlets deployed on the plurality of network elements, and if any of the intentlets is not in effect on any particular network element (e.g., the actual network configuration executing on the particular network element has drifted away from the deployed intentlet), the intentlet is reapplied on the particular network element appropriately.

In some embodiments, controllers (e.g., 18(1), 18(2)) may implement a management service for roughly consistent application of intent across network 12. Intentlets may be deployed across network elements (e.g., 16(1), 16(2)) in network 12 with sub-transactional semantics. In some embodiments, the management service may deploy intentlets with best-effort deployment. Embodiments of communication system 10 do not require a specific intentlet agent to apply the intent. However, in order to facilitate application across network 12, configurations in the intentlets may be supported across multiple network elements in network 12. In a general sense, intentlets can be considered as policy renderable locally as needed to hide variations in device interfaces from the controller, and to reduce the chances of the intentlets being rejected by any agents due to lack of capabilities or inability to correctly interpret the intentlet.

In various embodiments, the management service may monitor and maintain an overall state of the intent deployment across network 12, providing users with a clear indication where the intentlet was applied and where the intentlet could not be applied, including the reasons why it could not be applied (e.g., due to conflicting and overriding intent from another source, due to a communication failure, due to lack of capabilities in the network element, or due to other reasons). The management service may address intent drift, allowing automatic reapplication of the intentlets, for example, if they are no longer effective (e.g., due to inadvertent override through another controller or a local interface), or if errors were originally encountered during the deployment that may been resolved over time, or if a conflicting intentlet that originally prevented successful deployment expired or was removed. The management service may allow pre-configuration of accuracy and convergence bounds for network-wide intentlets, including policies regarding actions to take if the accuracy and convergence bounds cannot be maintained. For example, a user may specify that network intent should be retracted and/or an alert be emitted if network intent cannot be enacted on 98% of systems within 120 minutes of initial deployment.

In various embodiments, the management service may be implemented as a controller application (e.g., application executing at the controller). The controller application may take as input an intentlet (e.g., providing a portion of network intent), a set of network element (e.g., received in a list format, or as specified through a network scope service), and an optional set of intent deployment parameters. The intent deployment parameters can include scheduling information (e.g., specifying a time period for deploying ore retracting the intent), convergence objectives (e.g., specifying a percentage of network elements for which deployment should be successful), appropriate policy (e.g. retract, or "do not commit" in case of staged intentlets), and conditions to monitor drift (e.g., for auditing and reapplying intentlets as needed).

In some embodiments, for example, when a broad intent can only be partially met by the network element (e.g., 16(2)), a proper merger of the policies may be mediated by the network element (e.g., 16(2)). In other embodiments, the network element that cannot completely meet the broad intent may suggest alternatives, instead of a simple revoke. In some embodiments where multiple controllers are asserting intent into network element 16(1), appropriate algorithms could enable bidding between the controllers to determine the specific intent that may be honored by network element 16(1) for a period of time, allowing controllers bidding for a wholesaler network paths/lambdas that already have been allocated. Such mechanisms may be used by network processing resources (e.g., firewalls) rather than forwarding elements (e.g., routers).

Embodiments of communication system 10 can provide for a management service that allows for roughly consistent application of intent across network 12 to be used by applications that do not have stringent transactional requirements. Various such embodiments may enable more robust network-level configurations in environments where rough (not strict or absolute) consistency is sufficient. The mechanisms described herein can facilitate less overhead, better performance, and more flexibility than network-level transactions of intent applications. The management service as described herein can relieve applications from second-order management tasks, and allow users to specify and manage specific convergence objectives.

Embodiments of communication system 10 may assume a given set of network elements over which configuration through intentlets may be applied. Embodiments of communication system 10 can address drift (e.g., deviation of the network configuration by individual network elements) with automatic redress of the drift over time, for example, eventually bringing various network elements into consistent implementation. Embodiments of communication system 10 can allow users to monitor a degree of degradation of configuration, including network analytics tasks that cannot be successfully deployed across the network.

Embodiments of communication system 10 allows users to easily manage environments in which network configuration implementation success guarantees cannot be provided. Embodiments of communication system 10 can facilitate monitoring of intent implementation, allowing users to monitor intent drift and specify accuracy and convergence bounds for network-wide implementation of intentlets. As long as the number of network elements at which the intentlets were successfully implemented is significantly large, it is possible to achieve a rough consensus of roughly consistent intent implementation across the network.

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, controllers 18(1) and 18(2) may comprise applications executing in suitable network elements in network 12. Controller applications can also include appropriate rules engines, data stores, and other components to enable operations as described herein. In some embodiments, the management service for deploying intentlets may comprise an application executing with the corresponding controller on any suitable network element.

Figure 2:
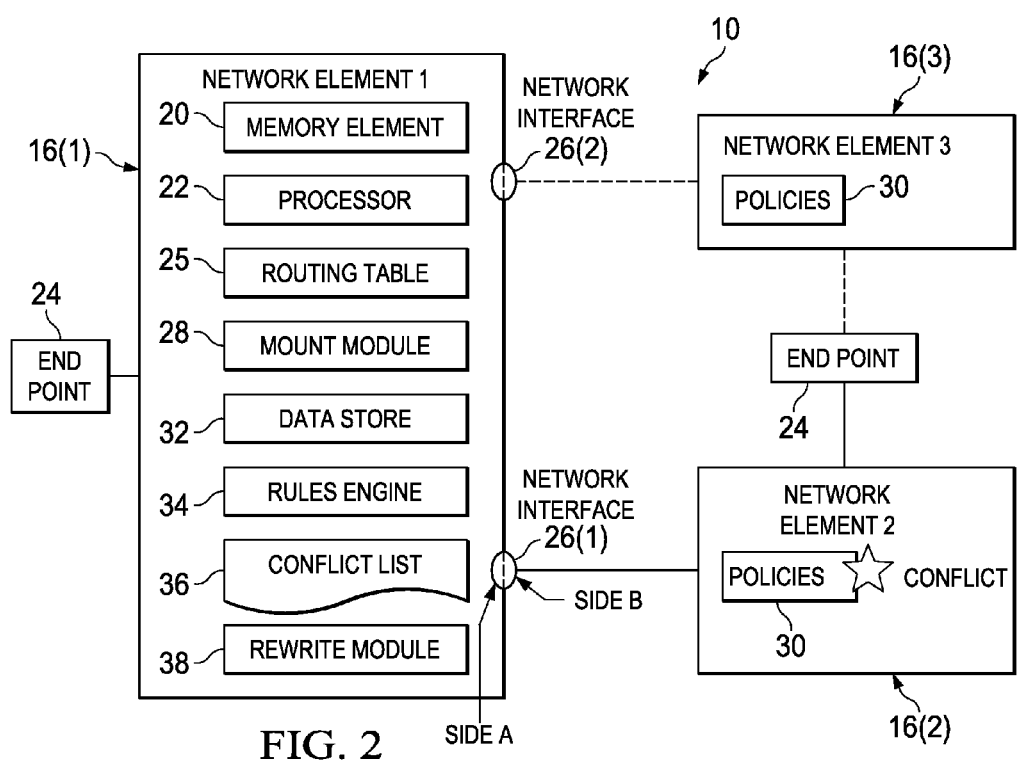
FIG. 2 is a simplified block diagram illustrating example details of embodiments of the communication system.

Turning to FIG. 2, FIG. 2 is a simplified block diagram illustrating example details of an embodiment of communication system 10. Example network element 16(1)

includes a memory element 20 and a processor 22 for facilitating various operations described herein. Assume, merely for example purposes that network traffic is being steered between two endpoints 24 through network elements 16(1) and 16(2). A routing table 25 (e.g., data table stored in network element (e.g., 16(1)) that lists various routes to particular network destinations) in network element 16(1) may be populated with a next hop indicating network element 16(2) through a network interface 26(1). The routing table includes information about the topology of the network immediately around the network element having the routing table. Routing table 25 may be populated with entries according to suitable discovery protocols.

Network element 16(1) may include a plurality of network interfaces, including 26(1) and 26(2), coupled to network elements 16(2) and 16(3), respectively. Each coupling may comprise a direct or remote interconnection in a respective administrative or other policy domain. Note that remote interconnection may be implemented through connections that include other network elements in between without departing from the broad scope of the embodiments. Interfaces 26(1) and 26(2) can traverse multiple network elements, for example, over protocols such as TCP/IP, or UDP/IP, etc.). To facilitate remote configuration, multi-hop protocols and data format options, such as Simple Network Management Protocol (SNMP) SNMP, YANG/Netconf, etc. may be used with additional logic, as appropriate, to continually synchronize object states across the interfaces.

Each network interface (e.g., 26(1) and 26(2)) may include two sides: for example, network interface 16(1) has a side A facing internally, and another side B facing externally, towards network element 16(2). According to various embodiments, network element 16(1) may monitor externally facing side B. In some embodiments, the monitoring may be substantially continuous in time; in other embodiments, the monitoring may be performed intermittently; in yet other embodiments, the monitoring may be performed on an as-needed basis. During the monitoring, a mount module 28 in network element 16(1) may mount policies 30 stored in network element 16(2) into a data store 32 at network element 16(1). In some embodiments, remote network elements may appear as local elements (e.g., amenable to be locally addressable) after mounting the policies. A rules engine 34 at network element 16(1) may analyze the mounted policies for internal inconsistencies.

Assume, merely for example purposes, that policies 30 at network element 16(2) includes an asserted intent to allow all traffic from Region A and an implemented intent that blocks certain traffic from Region A. Assume that one of end points 24 is located in a region that is blocked according to the implemented intent, but allowed according to the asserted intent. Thus, an internal inconsistency may exist at network element 16(2) with respect to the traffic between end points 24. Rules engine 34 may detect the internal inconsistency and determine that an intent conflict exists. Rule engine 34 may populate a conflict list 36 comprising a list of network elements coupled to network element 16(1) that are experiencing an intent conflict associated with the traffic being steered thereto. A rewrite module 38 may rewrite routing table 25 to clear (e.g., delete, remove, etc.) conflicted network element 16(2) from the next hop entry for the traffic between end points 24. In some embodiments, rewrite module 38 may be configured to rewrite packet headers of individual packets appropriately.

Mount module 28 may mount policies 30 from network element 16(3) over network interface 26(2). Rules engine 34 may determine that network element 16(3) is not conflicted for the traffic between end points 24. Rewrite module 38 may rewrite routing table 25 to insert non-conflicted peer network element 16(3) as the next-hop entry for the traffic between end points 24. In some embodiments, rewrite module 38 may configure itself to rewrite packet headers of individual packets of the traffic to insert non-conflicted peer network element 16(3) as the next-hop entry. Subsequently, traffic between endpoints 24 may be routed through network elements 16(1) and 16(3) rather than between 16(1) and 16(2) without any manual intervention, or intervention from a central controller (or other equivalent external application).

In some embodiments, rewrite module 38 may be part of a FRR capability of network element 16(1). The intent conflict at network element 16(1) may be flagged to rewrite module 38 in a manner similar to a link breakage notification. Rewrite module 38 may inspect conflict list 36, determine that network element 16(3) is not listed therein, and rewrite routing table 25 (or packet headers, as appropriate) to route packets to network element 16(3) instead of network element 16(2). Subsequently, traffic between endpoints 24 may be routed through network elements 16(1) and 16(3) rather than between 16(1) and 16(2) without any manual intervention, or intervention from a central controller (or other equivalent external application).

Figure 3:
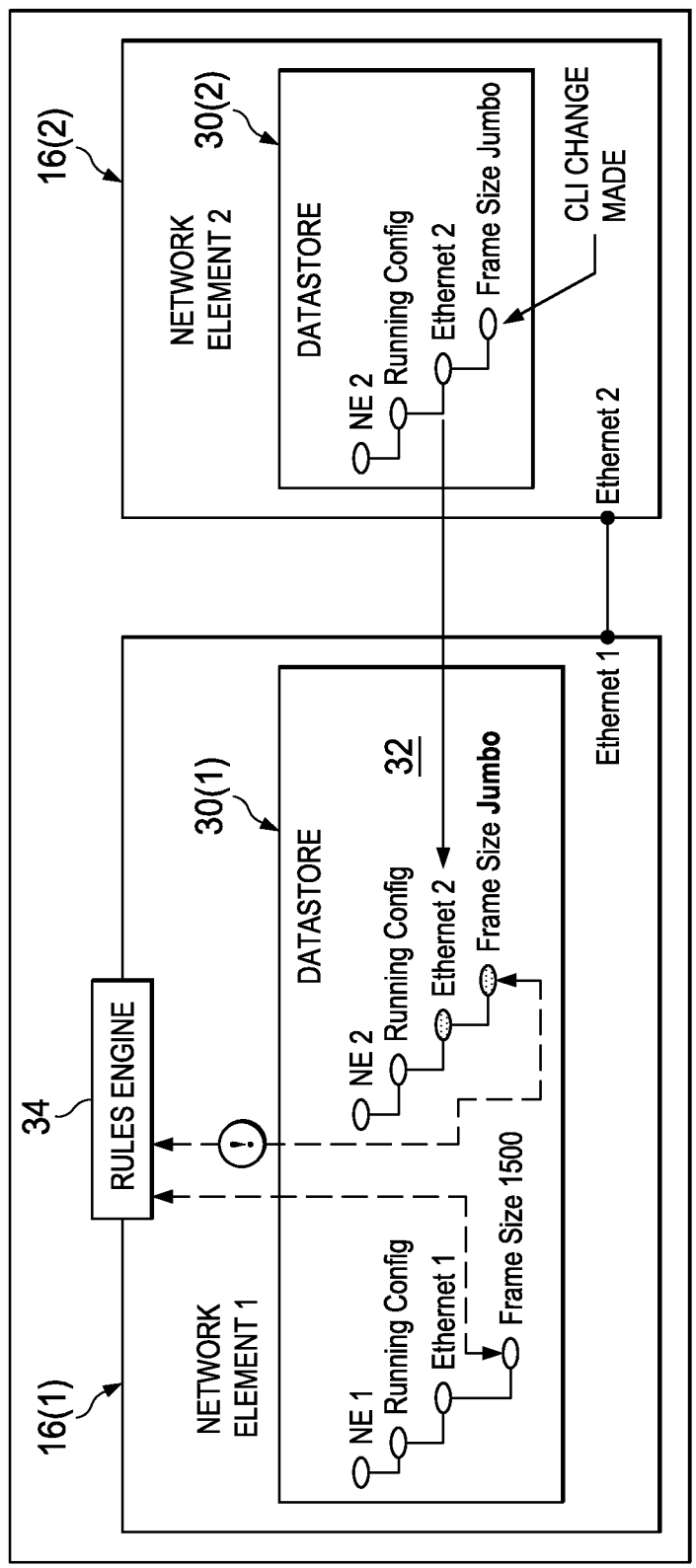
FIG. 3 is a simplified block diagram illustrating example details of embodiments of the communication system.

Turning to FIG. 3, FIG. 3 is a simplified block diagram illustrating example details of an embodiment of communication system 10. In some embodiments, the intent conflict may arise between two network elements, for example, 16(1) and 16(2). Assume, merely as an example, and not as a limitation that policies 30(1) at data store 32 in network element 16(1) includes an implemented intent that frame sizes at interface Ethernet 1 are limited to 1500. On the other hand, assume that a change in policies 30(2) at network element 16(2) results in another implemented intent that only jumbo frame sizes are allowed at interface Ethernet 2. After policies 30(2) at network element 16(2) are mounted into data store 32 in network element 16(1), rules engine 34 may determine that network interfaces Ethernet 1 and Ethernet 2 are coupled to each other, and the respective allowed frame sizes are inconsistent. As a result, the forwarding decision (e.g., enforced through the routing table at network element 16(1) or appropriate packet headers) may be changed to route traffic away from conflicted network element 16(2).

Figure 4:
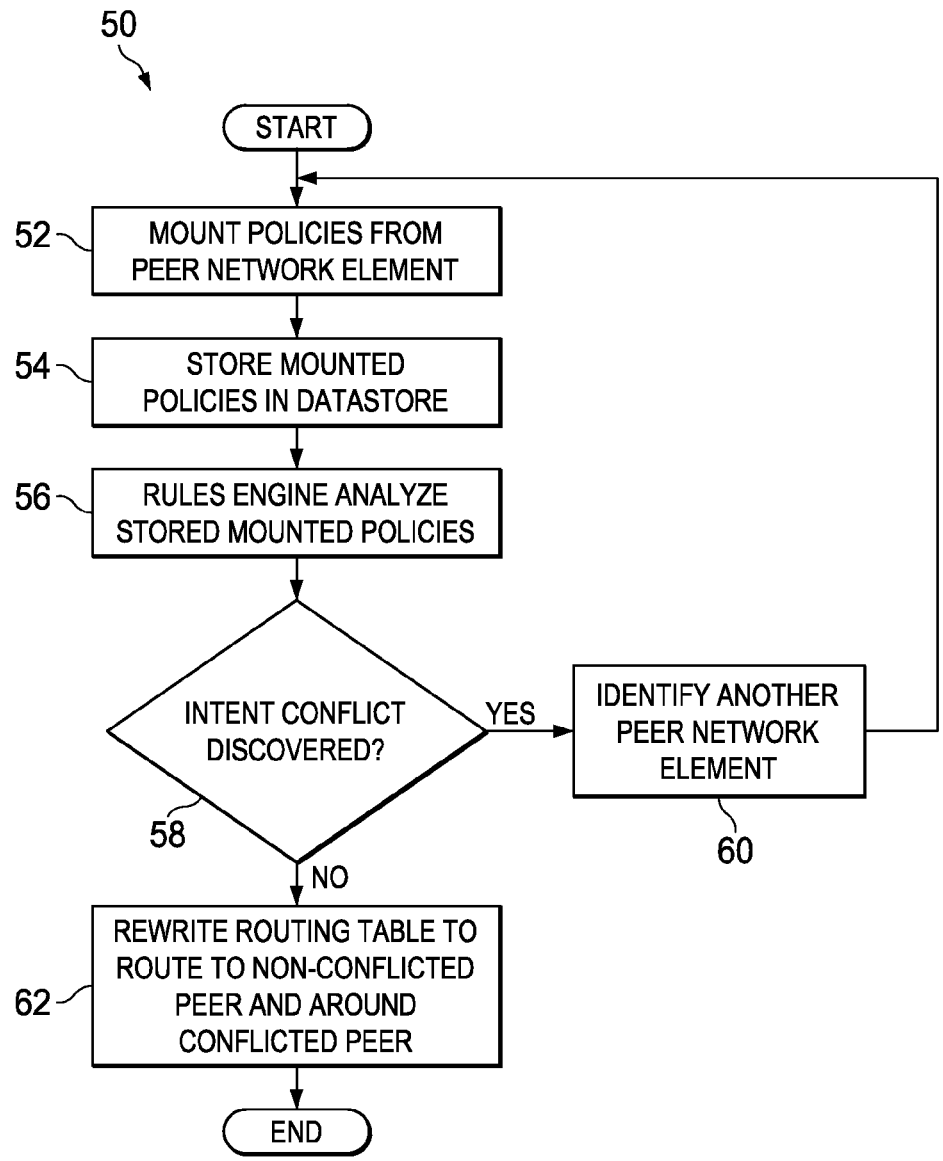
FIG. 4 is a simplified flow diagram illustrating example operations that may be associated with embodiments of the communication system.

Turning to FIG. 4, FIG. 4 is a simplified flow diagram illustrating example operations that may be associated with an embodiment of communication system 10. At 52, policies 30 from peer network element 16(2) may be mounted at network element 16(1). At 54, network element 16(1) may store the mounted policies in data store 32. At 56, rules engine 34 may analyze the stored mounted policies for inconsistencies (e.g., internal inconsistency, or inconsistency with implemented or asserted intent at network element 16(1)). At 58, a determination may be made whether an intent conflict has been discovered. If the intent conflict is discovered, at 60, network element 16(1) may identify another peer network element to study, and the operations may loop back to 52. On the other hand, if the intent conflict is resolved, or does not exist, routing table 25 (or packet headers of individual packets of the traffic) at network element 16(1) may be rewritten to route traffic to non-conflicted peer network element (e.g., 16(3)) and around (e.g., away from) conflicted peer network element 16(2).

Figure 5:
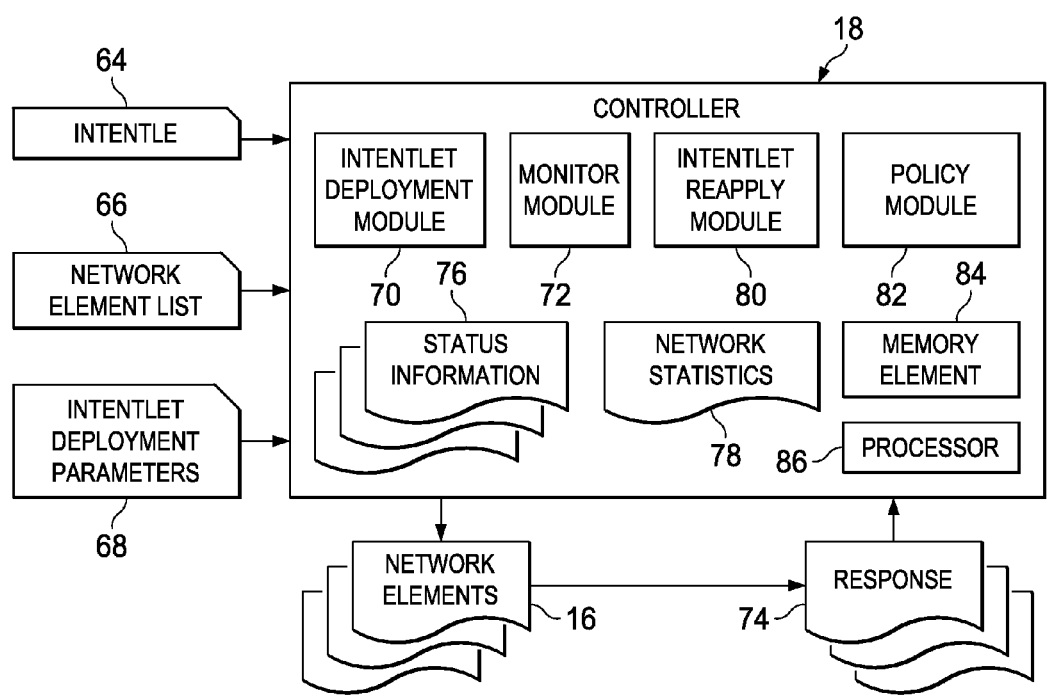
FIG. 5 is a simplified block diagram illustrating other example details of embodiments of the communication system.

Turning to FIG. 5, FIG. 5 is a simplified block diagram illustrating example details of an example controller 18. Controller 18 may receive as input one or more intentlet(s)

64, a network element list 66 on which intentlet 64 is to be applied, and an optional intentlet deployment parameters 68. An intent deployment module 70 in controller 18 may deploy intentlet 64 on network elements 16 in network element list 66 according to intentlet deployment parameters 68. A monitor module 72 may monitor responses 74 from network elements 16 that indicate whether the deployment was successful, and if not, the reason for the failure. Monitor module 72 may maintain status information 76 of intentlet deployment at network elements 16, and network statistics 78 indicating an overall network status of the intentlet deployment activities.

Depending on the pre-configured policy, controller 18 may attempt to reapply intentlets if the prior deployment failed. If intentlet 64 could not be deployed successfully, monitor module 72 may monitor network elements 16 to determine if intentlet 64 can be re-deployed. In some embodiments, monitor module 72 may periodically audit network elements 16 (e.g., when configuration change event notifications are received) to determine whether intentlets are continuing to be in effect. For example, when intentlet 64 could originally not be applied due to a conflict with another intentlet that took precedence (e.g., because it had been applied earlier, or because it has a higher priority), and the intentlet with higher precedence is revoked or expires, intentlet reapply module 80 may redeploy intentlet 64 and update status information 76 and network statistics 78 accordingly, for example, resulting in greater cross-network convergence over time. In another scenario, the configuration of intentlet 64 may have changed over time, and drifted away from the deployed parameters. Intentlet reapply module 80 may redeploy intentlet 64 as needed on appropriate network elements 16, for example, to compensate for failed deployments, drifts, etc.

Figure 6:
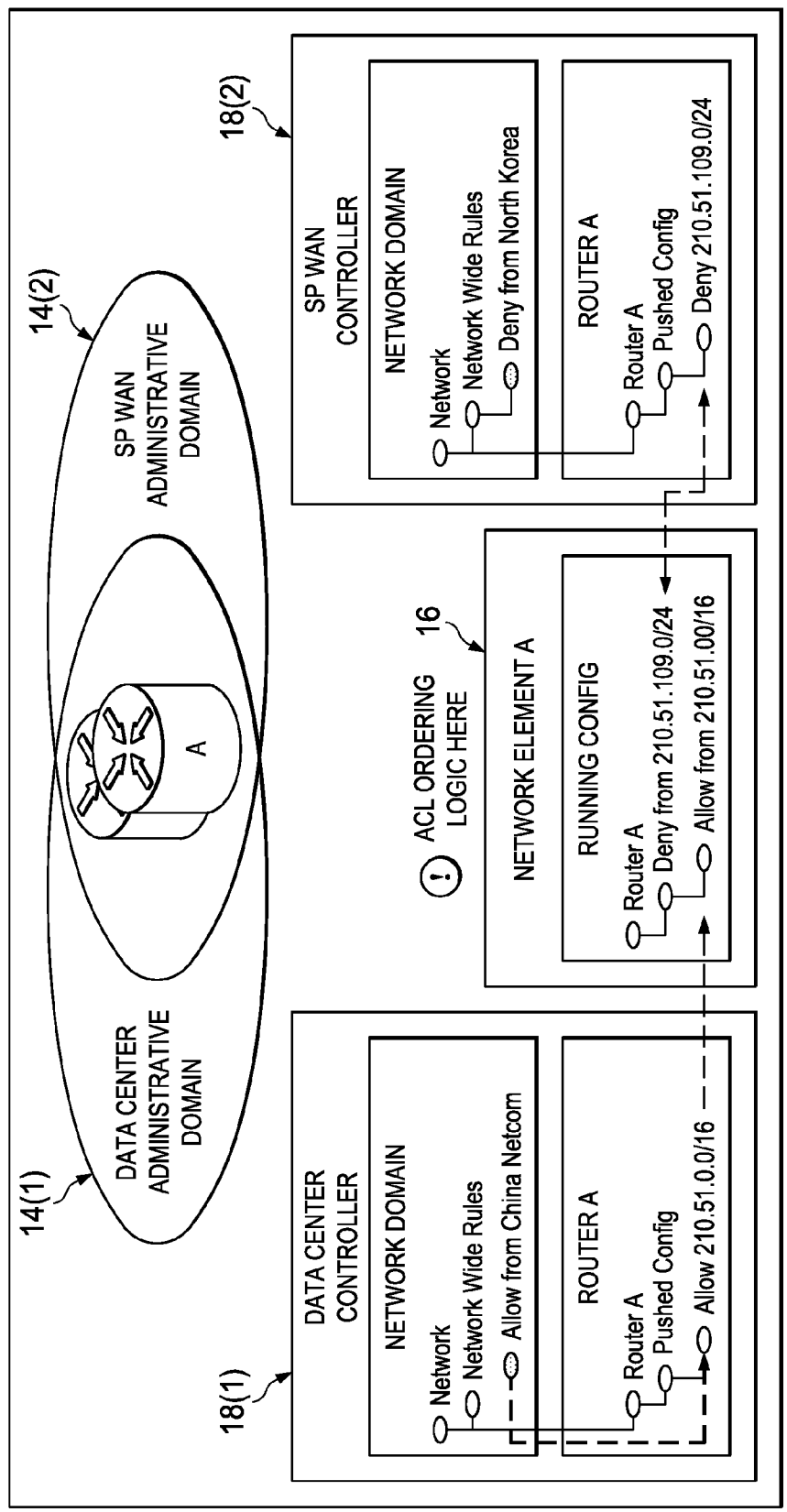
FIG. 6 is a simplified block diagram illustrating yet other example details of embodiments of the communication system.

Turning to FIG. 6, FIG. 6 is a simplified block diagram illustrating example details of an embodiment of communication system 10. Example network element 16 may receive intents asserted by two different controllers 18(1) and 18(2). Network element 16 may reorder the asserted intents, for example, based on relative priority in time, or importance, for example, to maximize the result that matches the two controllers' directives. In the example shown in the figure, network element 16 may reorder the intents based on a pre-assigned priority of a North Korea rule from SP WAN controller 18(2). Network element 16 may notify data center controller 18(1) and SP WAN controller 18(2) of the re-ordering, and the final implemented intent.

Figure 7:
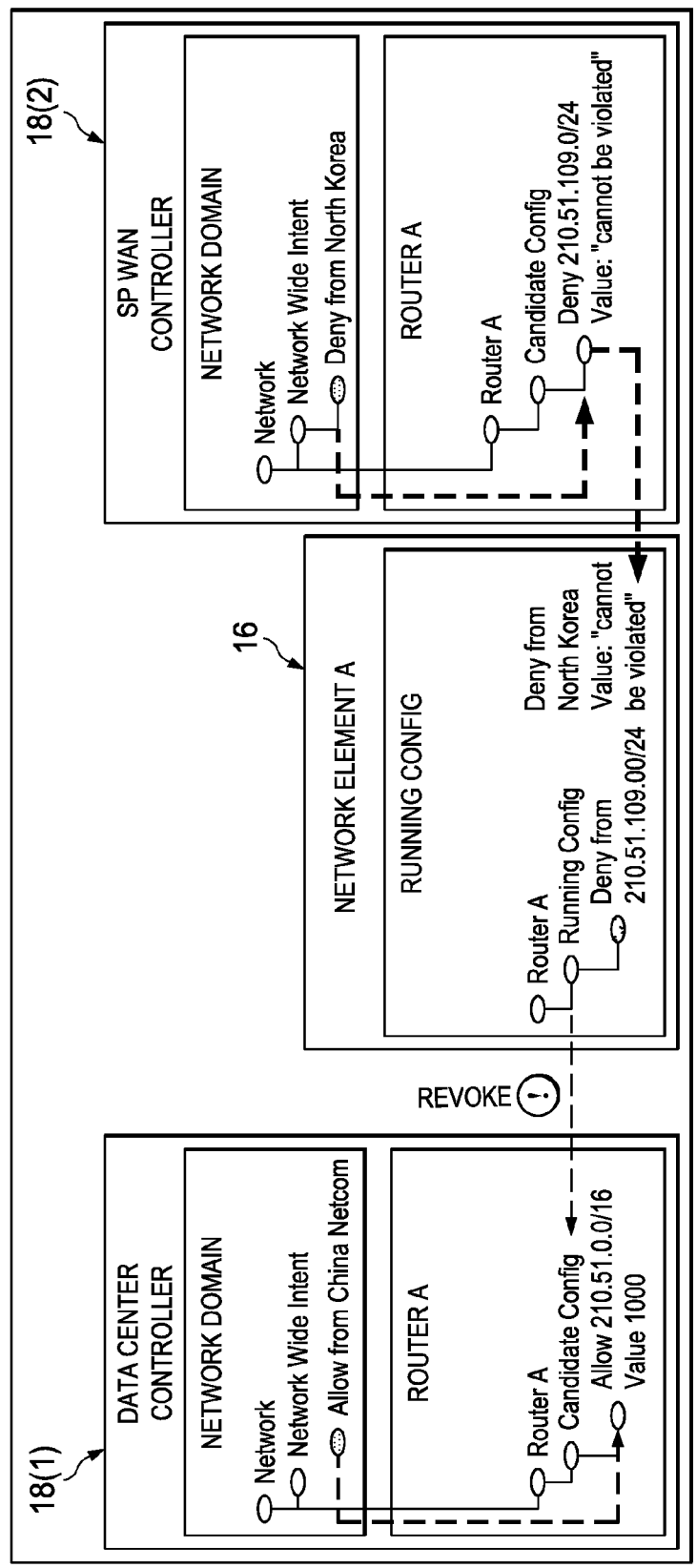
FIG. 7 is a simplified block diagram illustrating yet other example details of embodiments of the communication system.

Turning to FIG. 7, FIG. 7 is a simplified block diagram illustrating example details of an embodiment of communication system 10. In some embodiments, an unexpected revoke of intent when a higher priority intent is asserted may not be easy for the network to handle ad-hoc. In some embodiments, network element 16, on which the different priority or conflicting intents are asserted may suggest (and even impose alternatives) to the intent originators. Turning back to the conflicting North Korea Policy described previously, where data center controller 18(1) asserts an intent on network element 16(1) to allow China Netcom traffic that conflicts with a previously asserted (and implemented intent) from SP WAN controller 18(2) to deny North Korea traffic, network element 16 could suggest alternatives that are better than no policy support at all. For example, network element 16 may suggest to data center controller 18(1) that the North Korea traffic portion of the China Netcom traffic may be revoked, while allowing other China Netcom traffic.

Figure 8:
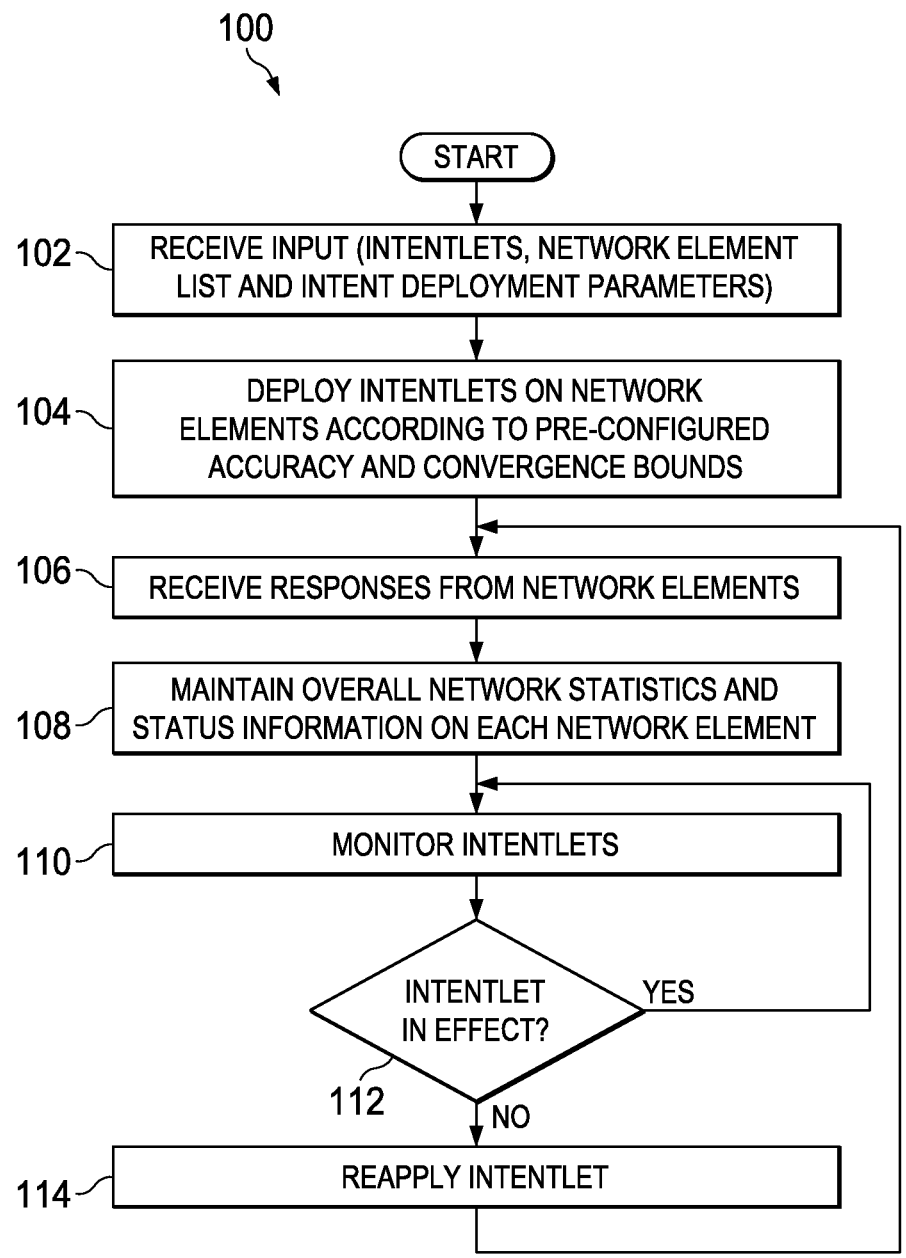
FIG. 8 is a simplified flow diagram illustrating other example operations that may be associated with an embodiment of the communication system.

Turning to FIG. 8, FIG. 8 is a simplified flow diagram illustrating example operations 100 that may be associated with deploying intentlets according to an embodiment of communication system 10. At 102, controller 18 may receive as input intentlet 64, network element list 66 and optional intentlet deployment parameters 68. At 104, controller 18 may deploy intentlet 64 on each network element 16 in network element list 66 according to pre-configured accuracy and convergence bounds (e.g., if accuracy and convergence bounds cannot be met, the deployment may be declared to have failed). At 106, controller 18 may receive response 74 from network element 16. At 108, controller 18 may maintain status information 76 on each network element and overall network statistics 78. At 110, controller 18 may monitor network 12, including intentlet 64. At 112, a determination may be made whether intentlet 64 is in effect. If so, the operations may loop back to 110, where the monitoring may continue. If intentlet 64 is not in effect, or the reason for a previous failed deployment has expired or is otherwise irrelevant, at 114, intentlet 64 may be reapplied, and the operations may loop back to 106, at which controller 18 receives response 74 regarding the status of the deployment from network elements 16.

Figure 9:
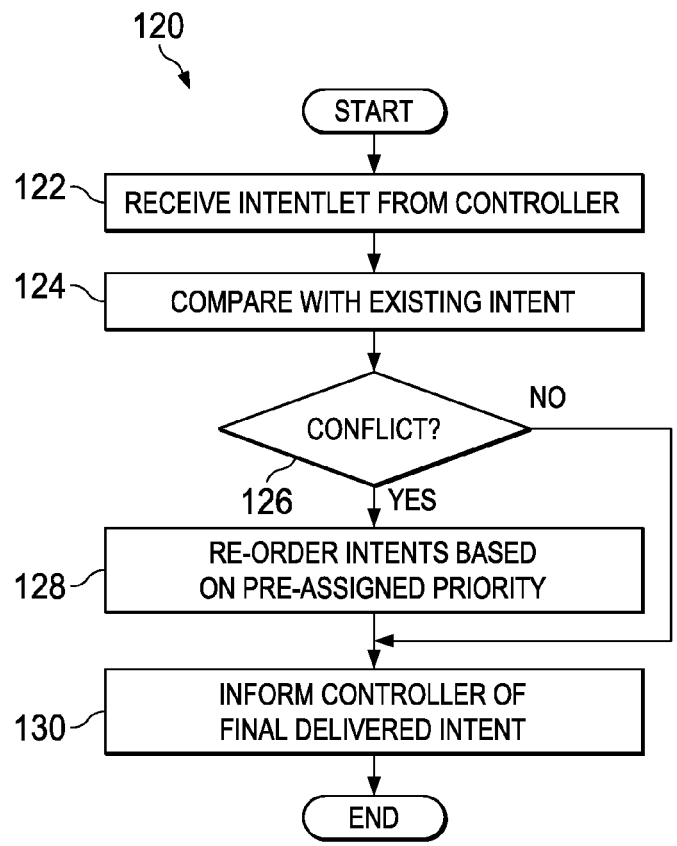
FIG. 9 is a simplified flow diagram illustrating yet other example operations that may be associated with an embodiment of the communication system.

Turning to FIG. 9, FIG. 9 is a simplified flow diagram illustrating example operations 120 that may be associated with deploying intentlets according to an embodiment of communication system 10. At 122, network element 16 may receive intentlet 64 from controller 18. At 124, network element 16 may compare asserted intentlet 64 with existing implemented (and other asserted) intents. At 126, a determination may be made whether a conflict exists between currently asserted intent 64 and other intent at network element 16. If the conflict exists, at 128, network element 16 may re-order the intents based on pre-assigned priority of the corresponding intents. At 130, network element 16 may send response 74 informing controller 18 of final delivered intent. Turning back to 126, if the conflict does not exist, the operations may step to 130, and network element 16 may send response 74 informing controller 18 of the successful intent deployment.

Figure 10:
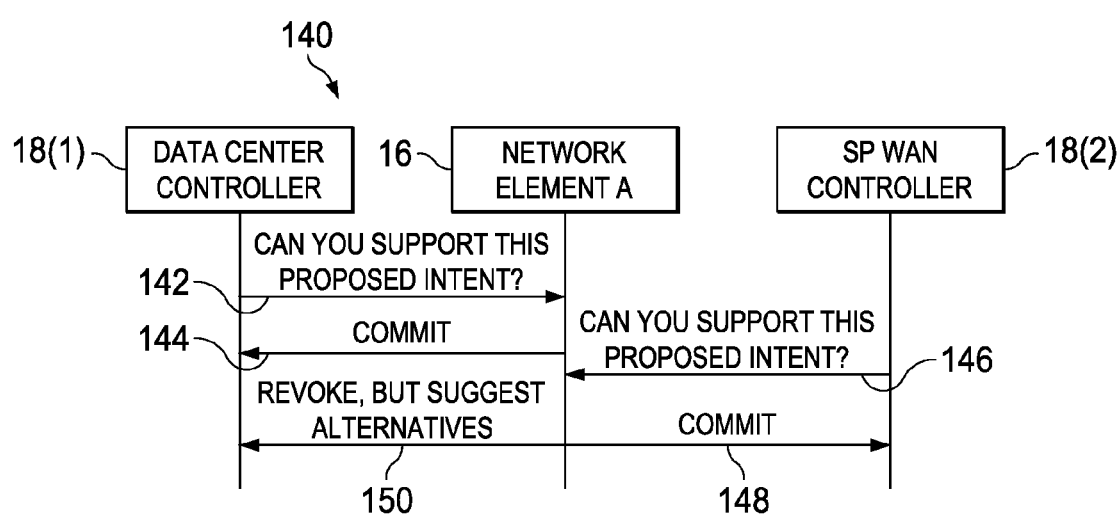
FIG. 10 is a simplified sequence diagram illustrating yet other example operations that may be associated with an embodiment of the communication system.

Turning to FIG. 10, FIG. 10 is a simplified sequence diagram illustrating example operations 140 that may be associated with deploying intentlets according to an embodiment of communication system 10. At 142, data center controller 18(1) may assert intentlet 64 on network element 16, with a query inquiring whether network element 16 can support intentlet 64. At 144, network element 16 may commit to intentlet 64 and send an appropriate response. At 146, SP WAN controller 18(2) may assert another intentlet on network element 16 that has a higher priority than intentlet 64. At 148, network element 16 may commit to the other intentlet and send an appropriate response to SP WAN controller 18(2). At 150, network element 16 may send a revoke message to data center controller 18(1), suggesting alternatives (e.g., allow all China Netcom traffic except North Korea traffic in the previously described North Korea policy example).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, network element(s) 16 and/or controller(s) 18. In some embodiments, one or more of these features may be implemented in hardware, provided external to these elements, or consolidated in any appropriate manner to achieve the intended functionality. The various network elements (e.g., network element(s) 16 and/or controller(s) 18) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, network element(s) 16 and/or controller(s) 18 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 20, 84) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 22, 86) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed at a network element in a network environment, comprising:
   receiving, at the network element, traffic between two endpoints, wherein the traffic is to be forwarded from the network element to a peer network element in the network according to a forwarding decision at the network element, the peer network element being coupled to the network element over a network interface of the network element, wherein the network element and the peer network element are intermediary nodes in the network for the traffic;
   detecting, at the network element, an intent conflict for forwarding the traffic at the peer network element, wherein the intent conflict exists at the peer network element, wherein the intent conflict comprises an incompatibility between an asserted intent for forwarding the traffic and an implemented intent for forwarding the traffic, wherein the peer network element cannot forward the traffic until the intent conflict is resolved, wherein the detecting comprises mounting rules from the peer network element into the network element over the network interface, wherein the mounted rules are acquired from a locally addressable data store, and analyzing the mounted rules for inconsistency to determine the intent conflict;
   changing the forwarding decision at the network element to steer traffic around the conflicted peer network element; and
   forwarding the traffic away from the conflicted peer network element, wherein a central controller in the network deploys one or more intentlets on a plurality of network elements in the network according to corresponding intent deployment parameters, wherein the intentlets are deployed according to pre-configured accuracy and convergence bounds.

2. The method of claim 1, further comprising:
   identifying another peer network element that does not have the intent conflict; and
   changing the forwarding decision to steer traffic to the another peer network element.

3. The method of claim 1, further comprising automatically generating a list of network elements that are conflicted.

4. The method of claim 1, wherein the central controller maintains status information connected with the intentlet deployment on each of the plurality of network elements.

5. The method of claim 1, wherein the controller monitors the intentlets deployed on the plurality of network elements, wherein if the intentlet is not implemented on any particular network element, the intentlet is reapplied on the particular network element.

6. The method of claim 5, wherein the controller queries the network elements for a cause of the intentlet not being implemented and determines whether corrective action should be taken before reapplying the intentlet.

7. The method of claim 1, further comprising:
   receiving an intentlet from the controller;
   comparing the received intentlet with existing intents implemented on the network element;
   re-ordering the existing intents and the received intentlet based on respective pre-assigned priorities when a conflict is detected between the received intentlet and one of the existing intents;
   deciding to deploy the received intentlet if the received intentlet is of higher priority than the conflicting existing intent; and
   deciding not to deploy the received intentlet if the received intentlet is not of higher priority than the conflicting existing intent.

8. The method of claim 7, further comprising periodically comparing the received intentlet with the existing intents, if the received intentlet is not deployed.

9. Non-transitory tangible media that includes instructions for execution, which when executed by a processor of a network element located in a network, is operable to perform operations comprising:
   receiving, at the network element, traffic between two endpoints, wherein the traffic is to be forwarded from the network element to a peer network element in the network according to a forwarding decision at the network element, the peer network element being coupled to the network element over a network interface of the network element, wherein the network element and the peer network element are intermediary nodes in the network for the traffic;
   detecting, at the network element, an intent conflict for forwarding the traffic at the peer network element, wherein the intent conflict exists at the peer network element, wherein the intent conflict comprises an incompatibility between an asserted intent for forwarding the traffic and an implemented intent for forwarding the traffic, wherein the peer network element cannot forward the traffic until the intent conflict is resolved, wherein the detecting comprises mounting rules from the peer network element into the network element over the network interface, wherein the mounted rules are acquired from a locally addressable data store, and analyzing the mounted rules for inconsistency to determine the intent conflict;
   changing the forwarding decision at the network element to steer traffic around the conflicted peer network element; and
   forwarding the traffic away from the conflicted peer network element, wherein a central controller in the network deploys one or more intentlets on a plurality of network elements in the network according to corresponding intent deployment parameters, wherein the intentlets are deployed according to pre-configured accuracy and convergence bounds.

10. The media of claim 9, wherein the operations further comprise:
    identifying another peer network element that does not have the intent conflict; and
    changing the forwarding decision to steer traffic to the another peer network element.

11. The media of claim 9, wherein the controller monitors the intentlets deployed on the plurality of network elements, wherein if any of the intentlets is not implemented on any particular network element, the intentlet is reapplied on the particular network element.

12. The media of claim 11, wherein the central controller queries the network elements for a cause of the intentlet not being implemented and determines whether corrective action should be taken before reapplying the intentlet.

13. The media of claim 9, wherein the operations further comprise automatically generating a list of network elements that are conflicted.

14. The media of claim 9, wherein the central controller maintains status information connected with the intentlet deployment on the plurality of network elements.

15. An apparatus located in a network, comprising:
a network interface;
a memory element for storing data; and
a processor, wherein the processor executes instructions associated with the data, wherein the processor and the memory element cooperate, such that the apparatus is configured for:
- receiving, at the apparatus, traffic between two endpoints, wherein the traffic is to be forwarded from the apparatus to a peer apparatus in the network according to a forwarding decision at the apparatus, the peer apparatus being coupled to the apparatus over the network interface, wherein the apparatus and the peer apparatus are intermediary nodes in the network for the traffic;
- detecting, at the apparatus, an intent conflict for forwarding the traffic at the peer apparatus, wherein the intent conflict exists at the peer apparatus, wherein the intent conflict comprises an incompatibility between an asserted intent for forwarding the traffic and an implemented intent for forwarding the traffic, wherein the peer apparatus cannot forward the traffic until the intent conflict is resolved, wherein the detecting comprises mounting rules from the peer apparatus into the apparatus over the network interface, wherein the mounted rules are acquired from a locally addressable data store, and analyzing the mounted rules for inconsistency to determine the intent conflict;
- changing the forwarding decision at the apparatus to steer traffic around the conflicted peer apparatus; and
- forwarding the traffic away from the conflicted peer apparatus, wherein a central controller in the network deploys one or more intentlets on a plurality of network elements in the network according to corresponding intent deployment parameters, wherein the intentlets are deployed according to pre-configured accuracy and convergence bounds.

16. The apparatus of claim 15, further configured for:
identifying another peer apparatus that does not have the intent conflict; and
changing the forwarding decision to steer traffic to the another peer apparatus.

17. The apparatus of claim 15, wherein the operations further comprise automatically generating a list of network elements that are conflicted.

18. The apparatus of claim 15, wherein the central controller maintains status information connected with the intentlet deployment on the plurality of network elements.

19. The apparatus of claim 15, wherein the central controller monitors the intentlets deployed on the plurality of network elements, wherein if any of the intentlets is not implemented on any particular network element, the intentlet is reapplied on the particular network element.

20. The apparatus of claim 19, wherein the central controller queries the network elements for a cause of the intentlet not being implemented and determines whether corrective action should be taken before reapplying the intentlet.

* * * * *